(12) United States Patent
Pollack

(10) Patent No.: US 11,220,218 B2
(45) Date of Patent: Jan. 11, 2022

(54) REARVIEW ASSEMBLY HOUSING WITH RADIO FREQUENCY ACTIVATED BOND

(71) Applicant: Gentex Corporation, Zeeland, MI (US)

(72) Inventor: Christopher D. Pollack, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 371 days.

(21) Appl. No.: 16/513,472

(22) Filed: Jul. 16, 2019

(65) Prior Publication Data

US 2020/0023777 A1 Jan. 23, 2020

Related U.S. Application Data

(60) Provisional application No. 62/700,570, filed on Jul. 19, 2018.

(51) Int. Cl.
*B60R 1/12* (2006.01)
*B60R 1/04* (2006.01)
*B29C 65/14* (2006.01)
*B29L 11/00* (2006.01)
*G02B 7/182* (2021.01)

(52) U.S. Cl.
CPC ............ *B60R 1/12* (2013.01); *B29C 65/1425* (2013.01); *B29C 65/1448* (2013.01); *B60R 1/04* (2013.01); *B29L 2011/0058* (2013.01); *B60R 2001/1223* (2013.01); *G02B 7/182* (2013.01)

(58) Field of Classification Search
CPC ..... B60R 1/04; B60R 1/12; B60R 2001/1223; G02B 7/182; B29C 65/1425; B29C 65/1448; B29L 2011/0058

USPC .................................................. 359/838, 871
See application file for complete search history.

(56) References Cited

U.S. PATENT DOCUMENTS

| | | | | |
|---|---|---|---|---|
| 4,550,986 A * | 11/1985 | Leach | ...................... | B32B 5/18 |
| | | | | 156/308.2 |
| 5,649,756 A | 7/1997 | Adams et al. | | |
| 6,170,956 B1 * | 1/2001 | Rumsey | ............... | B60Q 1/2665 |
| | | | | 359/603 |
| 7,338,177 B2 * | 3/2008 | Lynam | ..................... | B60R 1/12 |
| | | | | 340/425.5 |
| 8,100,568 B2 | 1/2012 | DeLine et al. | | |
| 8,730,553 B2 | 5/2014 | De Wind et al. | | |
| 8,827,517 B2 * | 9/2014 | Cammenga | ............... | B60R 1/12 |
| | | | | 362/494 |
| 9,156,403 B2 * | 10/2015 | Rawlings | .................. | B60R 1/04 |
| 9,174,578 B2 | 11/2015 | Uken et al. | | |
| 9,278,654 B2 | 3/2016 | Skiver et al. | | |
| 9,557,584 B2 * | 1/2017 | Uken | .................... | B60R 1/1207 |
| 9,694,751 B2 * | 7/2017 | Lundy, Jr. | ........... | B60R 16/0207 |
| 10,131,279 B2 | 11/2018 | Minikey, Jr. et al. | | |
| 2004/0246607 A1 * | 12/2004 | Watson | ..................... | B60R 1/12 |
| | | | | 359/872 |
| 2006/0139781 A1 * | 6/2006 | Waldmann | .......... | B29C 66/5346 |
| | | | | 359/872 |

(Continued)

*Primary Examiner* — Ricky D Shafer
(74) *Attorney, Agent, or Firm* — Price Heneveld LLP; Brian James Brewer

(57) ABSTRACT

A method of making a rearview assembly includes operably coupling a rearview device with a front housing. A bonding material is applied to the front housing and a printed circuit board is operably coupled with the front housing. A rear housing is engaged with the front housing. Energy is applied to bond the front housing with the rear housing.

19 Claims, 5 Drawing Sheets

(56) References Cited

U.S. PATENT DOCUMENTS

2014/0307344 A1 10/2014 Cammenga et al.
2016/0341963 A1 11/2016 Minikey, Jr. et al.
2017/0232899 A1 8/2017 De Wind et al.

* cited by examiner

REARVIEW ASSEMBLY HOUSING WITH RADIO FREQUENCY ACTIVATED BOND

CROSS-REFERENCE TO RELATED APPLICATION

This application claims priority to and the benefit under 35 U.S.C. § 119(e) of U.S. Provisional Application No. 62/700,570, filed on Jul. 19, 2018, entitled "REARVIEW ASSEMBLY HOUSING WITH RADIO FREQUENCY ACTIVATED BOND," the disclosure of which is hereby incorporated herein by reference in its entirety.

FIELD OF THE DISCLOSURE

The present disclosure generally relates to a rearview assembly, and more particularly to a rearview assembly having a radio frequency activated bond and a method of assembling the same.

SUMMARY OF THE DISCLOSURE

According to one aspect of the present disclosure, a rearview assembly includes a rearview device. A front housing defines a peripheral channel. A printed circuit board is operably coupled with the front housing. A rear housing defines a peripheral engagement protrusion. A bonding material is disposed in the peripheral channel between the front housing and the rear housing. The bonding material is configured to set upon application of energy to the peripheral channel after the front housing and the rear housing have been engaged.

According to another aspect of the present disclosure, a rearview assembly includes a rearview device. A front housing has a peripheral edge that defines a channel. The front housing supports a button pad that includes buttons projecting in a direction generally orthogonal to a planar extent of the rearview device. A printed circuit board is operably coupled with the front housing and is in electrical communication with the button pad. A rear housing defines a peripheral engagement protrusion and further defines a plurality of cutouts configured to receive the buttons. A bonding material is disposed in the channel between the front housing and the rear housing. The bonding material is configured to set upon application of energy to the channel after the front housing and the rear housing have been engaged.

According to yet another aspect of the present disclosure, a method of making a rearview assembly includes operably coupling a rearview device with a front housing. A bonding material is applied to the front housing. A printed circuit board is then operably coupled with the front housing. A rear housing is engaged with the front housing. Energy is applied at an interface of the rear housing and the front housing to bond the front housing with the rear housing. These and other features, advantages, and objects of the present disclosure will be further understood and appreciated by those skilled in the art by reference to the following specification, claims, and appended drawings.

DETAILED DESCRIPTION

Figure 1:
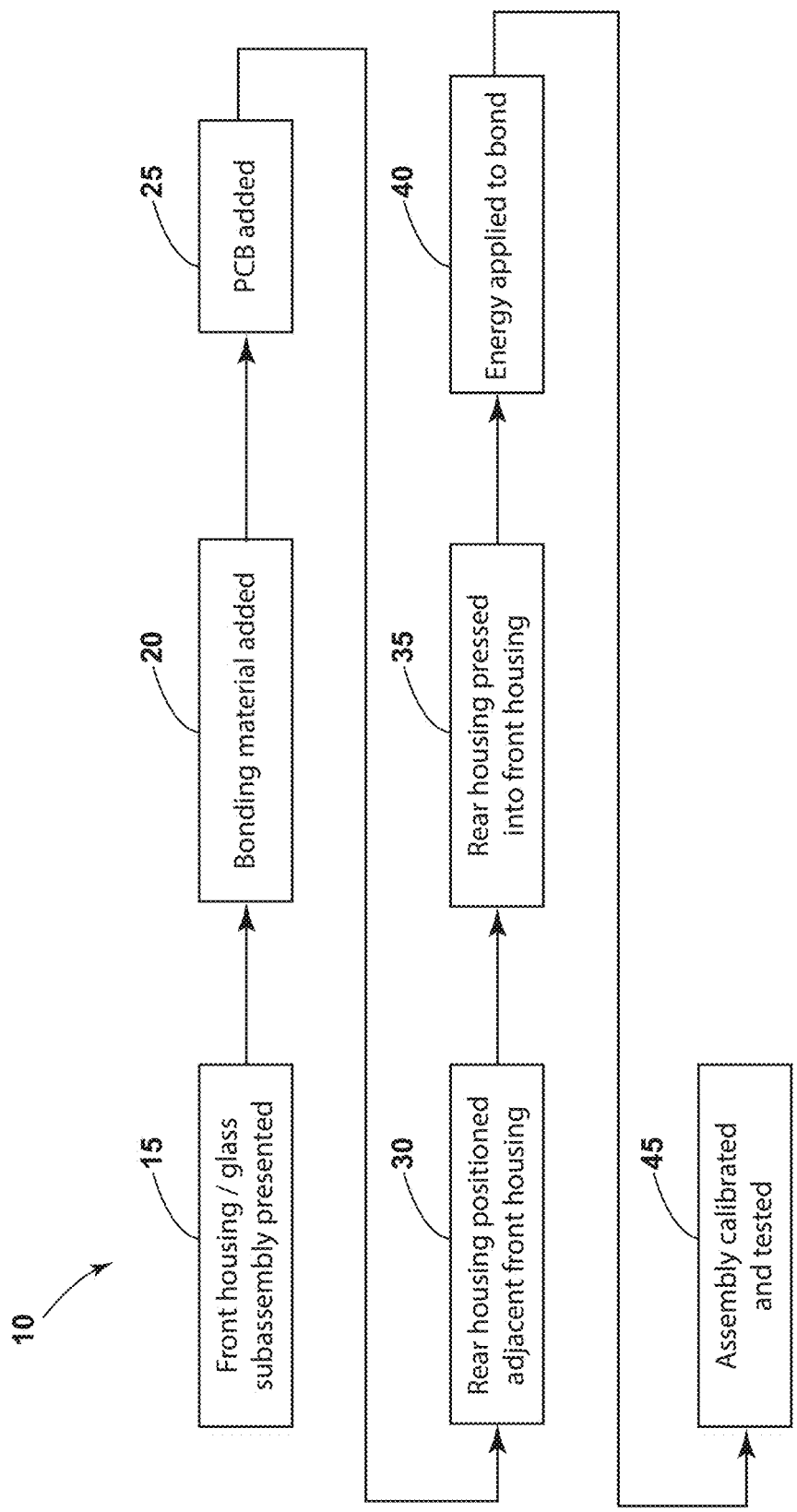
FIG. 1 is a flowchart illustrating the method for making a rearview assembly of the present disclosure.

The present illustrated embodiments reside primarily in combinations of method steps and apparatus components related to a rearview assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 2:
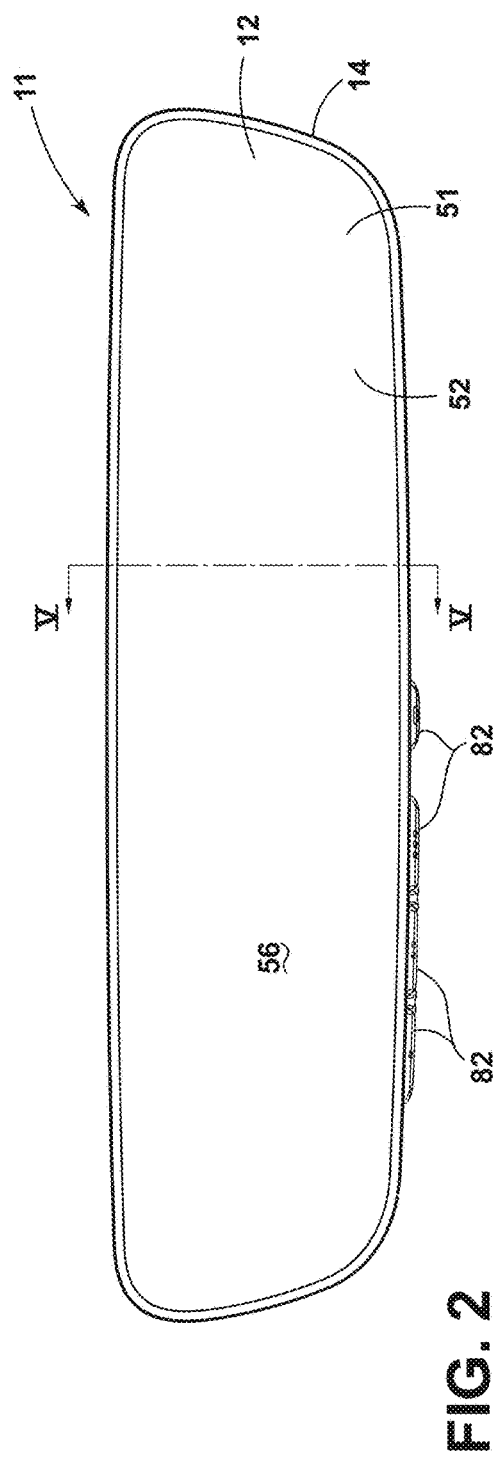
FIG. 2 is a front elevational view of one embodiment of a rearview assembly of the present disclosure.

For purposes of description herein, the terms "upper," "lower," "right," "left," "rear," "front," "vertical," "horizontal," and derivatives thereof, shall relate to the disclosure as oriented in FIG. 2. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

With reference to FIG. 1, a method 10 of making a rearview assembly 11 includes operably coupling a rearview device 12 with a front housing 14 (step 15). A bonding material 18 is applied to the front housing 14 (step 20) and a printed circuit board 24 is operably coupled (step 25) with the front housing 14. A rear housing 28 is positioned adjacent the front housing 14 (step 30), and the rear housing 28 is engaged with the front housing 14 (step 35). Energy is applied to the bonding material 18 to bond the front housing 14 with the rear housing 28 (step 40). The energy may be in the form of radio frequency (RF) energy. Optionally, the entire assembly can then be calibrated and tested (step 45).

With reference now to FIGS. 2-7, the rear housing 28 of the illustrated rearview assembly 11 is configured for uniform engagement with a rear peripheral rim 46 of the front housing 14. The rear peripheral rim 46 includes a rearwardly extending flange 47 that abuts a groove 48 defined by the rear housing 28. The rear peripheral rim 46 also includes a forwardly extending flange 49. The front housing 14 may include a bezel construction, a carrier plate construction, etc. configured to engage a front peripheral edge 50 of the rear housing 28. The front housing 14 extends about a periphery of the rearview device 12, which may include a prism-type mirror, or an electro-optic mirror assembly 51 that includes a front substrate 52 and a rear substrate 54. The front substrate 52 defines a first side 56 and a second side 58 and the rear substrate 54 defines a third side 60 and a fourth side 62. A reflective coating or reflective layer may be disposed on the third side 60 or fourth side 62 of the rear substrate 54. In addition, an electro-optic medium, such as an electrochromic medium, is positioned in a cavity 66 defined between the front substrate 52 and the rear substrate 54. The front housing 14 may be configured to engage a peripheral edge 68 and possibly the first side 56 of the front substrate 52. Alternatively, the front housing 14 may extend behind the front substrate 52. In the illustrated example, the front housing 14 also includes a rearwardly extending inside flange 69 that abuts an inside wall 71 of the rear housing 28. The front substrate 52 may include a rounded or ground edge 70 at a periphery of the first side 56. The front housing 14 is configured to engage the rear housing 28 at the front peripheral edge 50 of the rear housing 28. In addition, the front housing 14 generally defines a cavity 72 configured to receive a mounting pad 74 and at least a portion of the rear substrate 54.

As illustrated in FIG. 2, the rear housing 28 includes a plurality of cutouts 80 configured to receive a button pad 81 that includes buttons 82. It will be understood that the plurality of cutouts 80 may be openings where portion of the rear housing 28 are removed, openings formed in the rear housing 28 during molding, etc. The plurality of cutouts 80, and consequently the buttons 82, are disposed in a direction that is generally orthogonal to a planar extent of the rearview device 12, such as on a bottom side 84 of the rear housing 28, but could be located elsewhere about a periphery of the rear housing 28. Further, although four buttons 82 are shown, it will be understood that there could be zero buttons or several buttons (one, three, six, etc.). In addition, a mount 86 extends from a rear portion 88 of the rear housing 28 and includes a bracket 89 that is configured to engage a windscreen, or windshield, of a vehicle. The mount 86 may be a single ball mount or two ball mount, and may include wiring that extends through the mount 86. The wiring is configured to supply power and/or data to components (such as the electro-optic mirror assembly 51) disposed inside the rearview assembly 11. The rear housing 28 may also define an aperture 90. The aperture 90 may be in optical communication with an ambient light sensor 92 disposed within the rear housing 28. In this instance, an optic of the ambient light sensor 92 will be generally aligned with the aperture 90 and capture light data through the aperture 90 when in use. The light data can then be evaluated by a controller within the rear housing 28.

Figure 3:
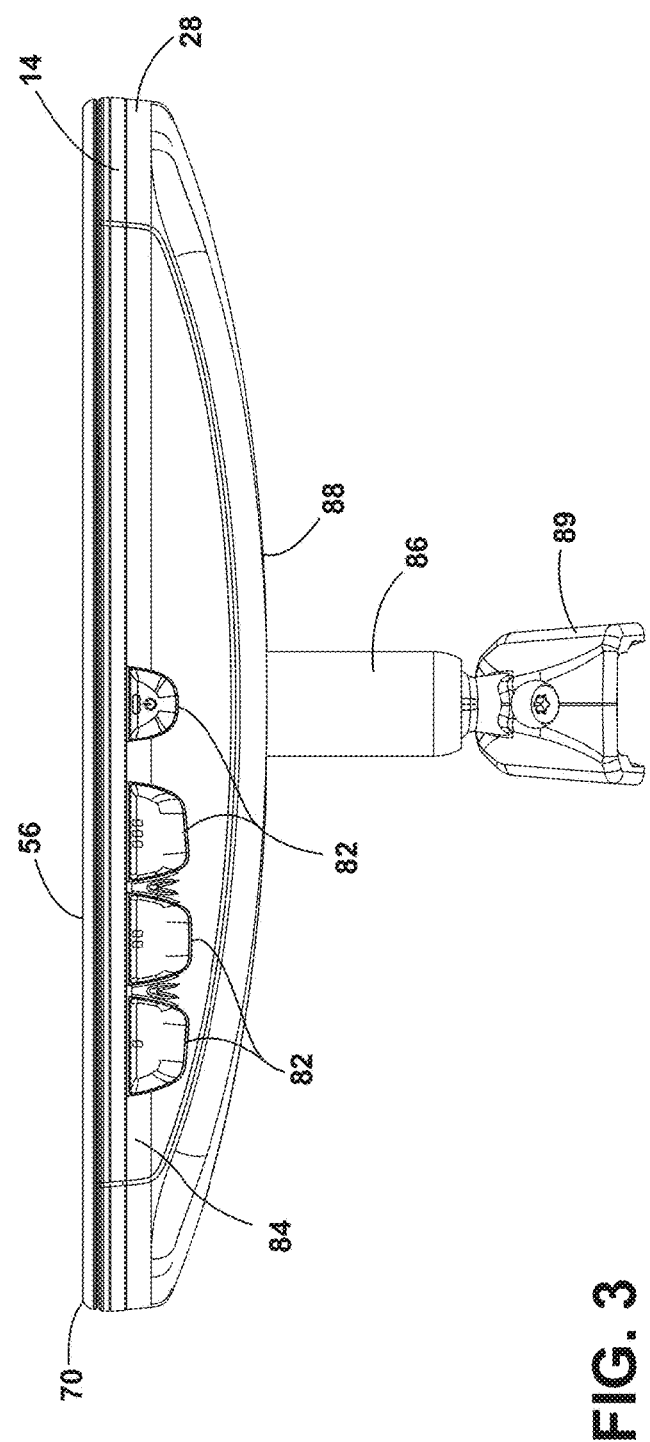
FIG. 3 is a bottom plan view of the rearview assembly of FIG. 1.

With reference now to FIG. 3, the rear housing 28 is shown separated from the front housing 14. As illustrated, the front peripheral edge 50 of the rear housing 28 and the rear peripheral rim 46 of the front housing 14 are free of clips, snap-fit attachments, mechanical fasteners, etc. The clips, snap-fit attachments, and other types of mechanical fastening, can result in buzz, squeak, and rattling concerns after long durations of use. In addition, traditional adhesives may either not be strong enough, lack sufficient durability, or may be difficult to apply or to cure. As a result, traditional adhesives are not desirable. As shown in FIG. 3, the bonding material 18 is provided between the front peripheral edge 50 of the rear housing 28 and the rear peripheral rim 46 of the front housing 14. In one instance, the bonding material 18 may be dispensed in a bead within a channel 100 defined at the rear peripheral rim 46 of the front housing 14. The bead may extend circumferentially about the front housing 14. However, other strategies for applying the bonding material 18 at the interface between the rear housing 28 and front housing 14 are also contemplated.

Figure 4:
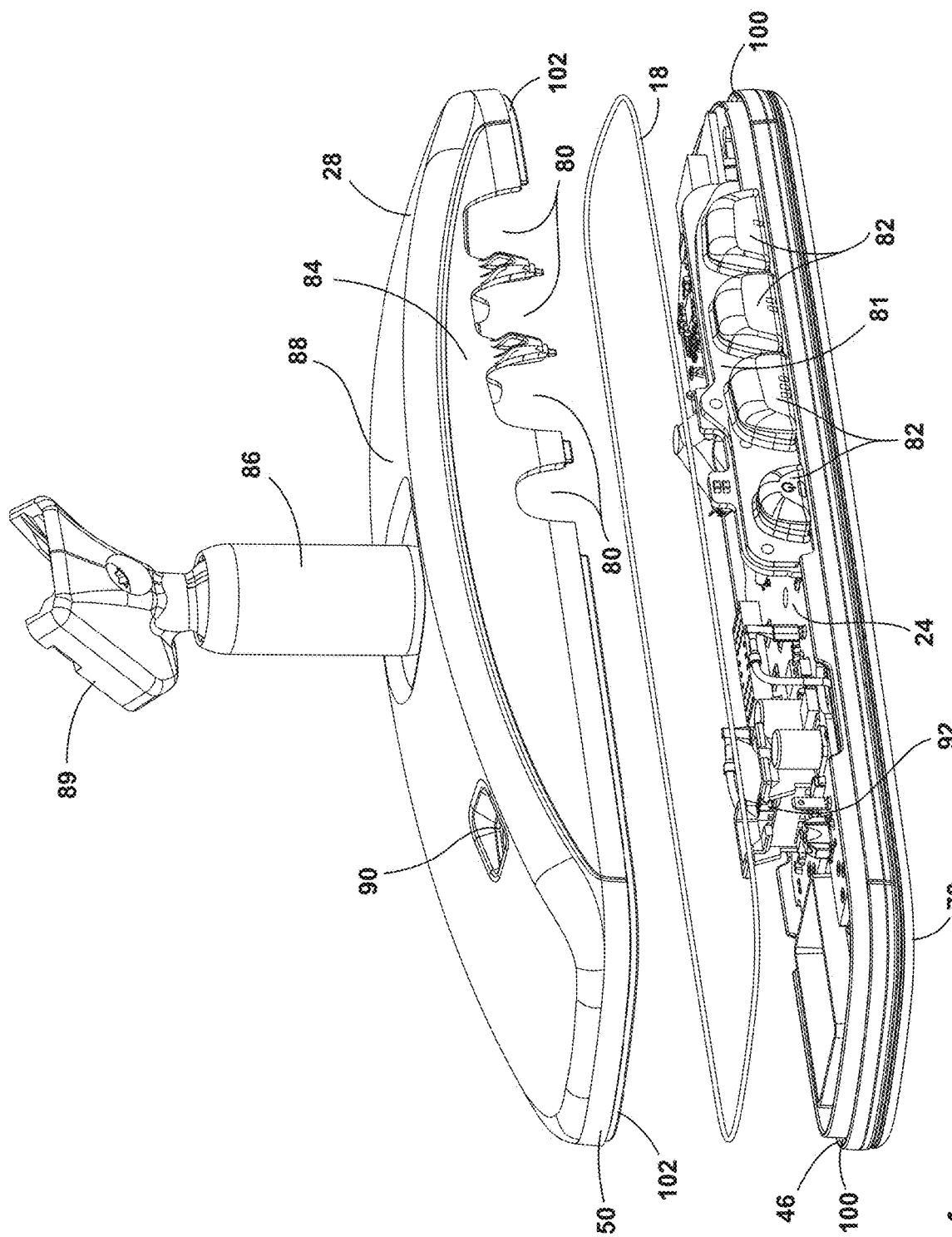
FIG. 4 is a bottom perspective view of a partially exploded rearview assembly.
Figure 5:
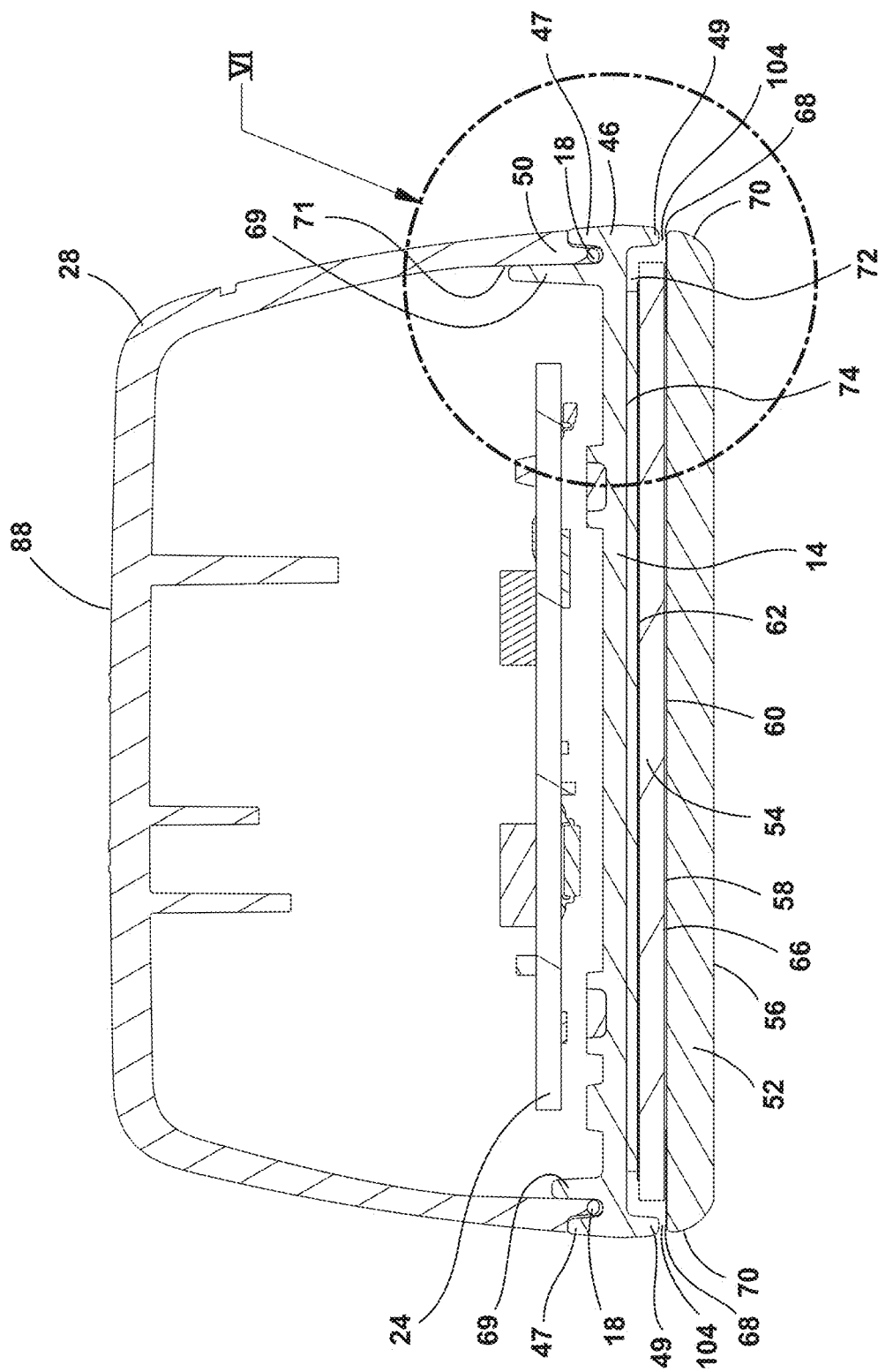
FIG. 5 is a side elevational cross-sectional view taken at A-A of FIG. 1.
Figure 6:
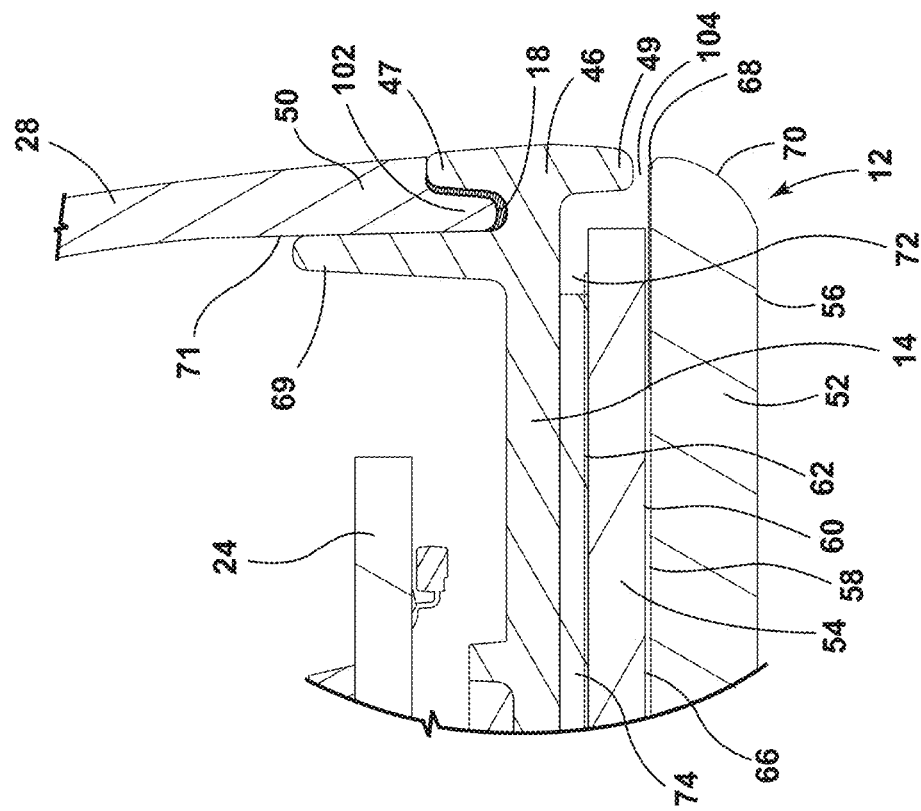
FIG. 6 is an enlarged partial elevational cross-sectional view of area B of FIG. 4 prior to engagement of the rear housing with the front housing.
Figure 7:
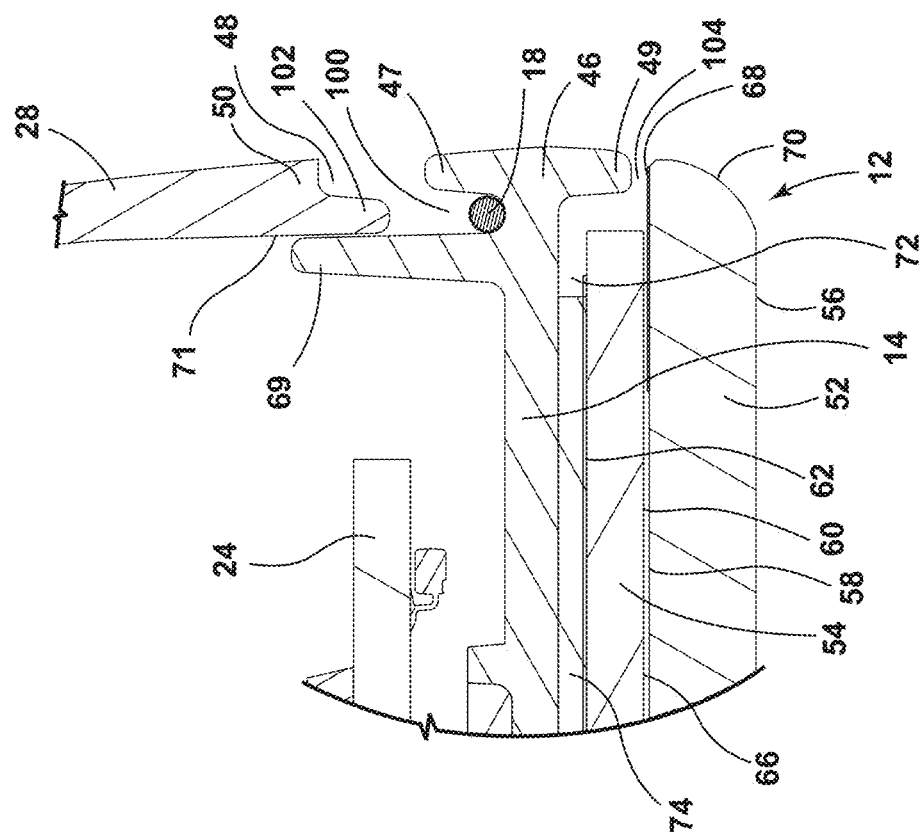
FIG. 7 is an enlarged partial elevational cross-sectional view of area B of FIG. 4 after engagement of the rear housing with the front housing.

With reference now to FIGS. 4-6, prior to engagement of the rear housing 28 with the front housing 14, the bonding material 18 is dispensed into the channel 100 of the front housing 14. The rear housing 28 includes an engagement protrusion 102 that extends forward about the periphery of the rear housing 28. The engagement protrusion 102 is configured for engagement with the channel 100 and is aligned with the channel 100 (FIG. 5). After alignment, the rear housing 28 is then forced into contact such that the engagement protrusion 102 is pushed into contact with the channel 100 of the front housing 14. As a result, the bonding material 18 is spread across the channel 100 creating an enlarged contact surface between the engagement protrusion 102 and channel 100, thereby creating a strong coupling between the rear housing 28 and the front housing 14. The rear housing 28 is pressed or moved into firm engagement with the front housing 14 and energy is applied to the bonding material 18 resulting in curing of the bonding material 18 within the channel 100. Once the bonding material 18 has set, the rear housing 28 and the front housing 14 are securely attached without the need for mechanical fasteners, snap-fit arrangements, etc. As shown in FIG. 5, after the front housing 14 and the rear housing 28 are securely engaged, a slight peripheral gap 104 may be provided between an outer edge of the front substrate 52 of the rearview device 12 and the forward extending flange 49 of the front housing 14. However, it is also contemplated that the front substrate 52 and the forward extending flange 49 could be in abutting contact.

The bonding material 18 may be cured using the RF energy. In some instances, the RF energy may be generally minimal and therefore generally undetectable by a user during assembly. In other instances, the RF energy may be in the form of electrical impulses that are generated by assembly equipment at very high cycles or frequency resulting heat at the bonding material 18. As RF waves pass through portions of the front housing 14 and rear housing 28, frictional heat may develop. However, the heat is generally uniform, resulting in even curing of the bonding material 18 between the front housing 14 and the rear housing 28. Moreover, the bonding material 18 is heated generally equally about the entirety of the rearview device 12 resulting in a consistent and repeatable process. The RF current gives a very fast and uniform increase in temperature resulting in an increased manufacturing speed. It is generally contemplated that the waves provided by the manufacturing equipment operate in an RF heating range and frequency of approximately 1.8 to 40 megacycles. To generate this RF heating range, electrodes may be disposed proximate the front housing 14 and rear housing 28. The electrodes create an oscillating electric field that shifts and moves polar molecules within the bonding material 18. The movement of these molecules may release heat energy. After a predetermined period of time, the molecules will begin to bond with the front housing 14 and the rear housing 28, and a successful coupling can be developed. It will be understood that the rear housing 28 and front housing 14 may be oriented so that the bonding material 18 is perpendicular to adjacent electrodes, or may be parallel to adjacent electrodes. However, it is also contemplated that the RF current generated by the manufacturing equipment may operate in a stray field condition where the electrodes are disposed on one side of the bonding material 18.

The manufacturing process, as outlined herein, minimizes or eliminates relative movement between the front housing 14 and the rear housing 28. As a result, buzz, squeak, and rattle of the front housing 14 relative to the rear housing 28 can be minimized or eliminated. In addition, the removal of mechanical fasteners including snap-fit connections and screws, etc. reduces tooling complexity and allows for more parts to be made in the same injection molding footprint. Consequently, component piece price is lowered. The RF manufacturing equipment directs the RF current at the targeted area located at the juncture between the front housing 14 and the rear housing 28. Accordingly, the remainder of the part does not need to be heated, thus reducing total energy consumption during the manufacturing process. It is contemplated that all or a portion of the RF welded components or bonding material 18 may include thermoplastic polyurethanes, polyvinyl chloride, polyethylene terephthalate, glycol, low density polyethylene, ethylene vinyl acetate, etc.

It has also been contemplated to mold the front housing 14 and rear housing 28 out of a material that can contain, or keep out, radio frequency/electromagnetic interference (RF/EMI) energy. This allows removal of the multiple board level shields that are currently placed within the assembly. One challenge with this has been how to ground the front housing 14 to the rear housing 28, completing the faraday cage. Use of an RF/EMI shield material integrated into the front housing 14 and/or rear housing 28 with the process described herein may overcome this challenge.

According to one aspect of the present disclosure, a rearview assembly includes a rearview device. A front housing defines a peripheral channel. A printed circuit board is operably coupled with the front housing. A rear housing defines a peripheral engagement protrusion. A bonding material is disposed in the peripheral channel between the front housing and the rear housing. The bonding material is configured to set upon application of energy to the peripheral channel after the front housing and the rear housing have been engaged.

According to another aspect of the present disclosure, an energy is radio frequency (RF) energy having a frequency between 1.8 and 40 megacycles.

According to still another aspect of the present disclosure, a front housing includes a peripheral rim disposed between a rearview device and a rear housing.

According to another aspect of the present disclosure, a rear housing defines an aperture through which an ambient light sensor receives light data.

According to yet another aspect of the present disclosure, a rearview device includes a front substrate and a rear substrate. A peripheral edge of the front substrate is exposed, while the rear substrate is concealed between the front substrate and a front housing.

According to another aspect of the present disclosure, a front housing includes a rearwardly extending inside flange that abuts an inside wall of a rear housing.

According to still another aspect of the present disclosure, a rearview assembly includes a rearview device. A front housing has a peripheral edge that defines a channel. The front housing supports a button pad that includes buttons projecting in a direction generally orthogonal to a planar extent of the rearview device. A printed circuit board is operably coupled with the front housing and is in electrical communication with the button pad. A rear housing defines a peripheral engagement protrusion and further defines a plurality of cutouts configured to receive the buttons. A bonding material is disposed in the channel between the front housing and the rear housing. The bonding material is configured to set upon application of energy to the channel after the front housing and the rear housing have been engaged.

According to still yet another aspect of the present disclosure, a method of making a rearview assembly includes operably coupling a rearview device with a front housing. A bonding material is applied to the front housing. A printed circuit board is then operably coupled with the front housing. A rear housing is engaged with the front housing. Energy is applied at an interface of the rear housing and the front housing to bond the front housing with the rear housing.

According to another aspect of the present disclosure, a step of applying energy includes applying radio frequency (RF) energy to an interface.

According to another aspect of the present disclosure, a step of applying RF energy includes applying RF energy at a frequency between 1.8 and 40 megacycles.

According to another aspect of the present disclosure, a step of engaging a rear housing with a front housing includes capturing an engagement protrusion of the rear housing within a channel of the front housing.

According to another aspect of the present disclosure, a step of capturing an engagement protrusion includes capturing the engagement protrusion between a peripheral rim and an inside flange of a front housing.

According to another aspect of the present disclosure, a step of operably coupling a rearview device with a front housing includes defining a peripheral gap between the front housing and an outer edge of the rearview device.

According to another aspect of the present disclosure, a step of operably coupling a rearview device with a front housing includes positioning a rear substrate of the rearview device within a cavity defined by the front housing.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A rearview assembly comprising:
   a rearview device;
   a front housing defining a peripheral channel;
   a printed circuit board operably coupled with the front housing;
   a rear housing defining a peripheral engagement protrusion; and
   a bonding material disposed in the peripheral channel between the front housing and the rear housing, the bonding material configured to set upon application of energy to the peripheral channel after the front housing and the rear housing have been engaged.

2. The rearview assembly of claim 1, wherein the energy is radio frequency (RF) energy having a frequency between 1.8 and 40 megacycles.

3. The rearview assembly of claim 1, wherein the front housing includes a peripheral rim disposed between the rearview device and the rear housing.

4. The rearview assembly of claim 1, wherein the rear housing defines an aperture through which an ambient light sensor receives light data.

5. The rearview assembly of claim 1, wherein the rearview device includes a front substrate and a rear substrate, and wherein a peripheral edge of the front substrate is exposed, while the rear substrate is concealed between the front substrate and the front housing.

6. The rearview assembly of claim 1, wherein the front housing includes a rearwardly extending inside flange that abuts an inside wall of the rear housing.

7. A rearview assembly comprising:
   a rearview device;
   a front housing having a peripheral edge that defines a channel, the front housing supporting a button pad that includes buttons projecting in a direction generally orthogonal to a planar extent of the rearview device;
   a printed circuit board operably coupled with the front housing and in electrical communication with the button pad;
   a rear housing defining a peripheral engagement protrusion and further defining a plurality of cutouts configured to receive the buttons; and
   a bonding material disposed in the channel between the front housing and the rear housing, the bonding material configured to set upon application of energy to the channel after the front housing and the rear housing have been engaged.

8. The rearview assembly of claim 7, wherein the energy is radio frequency (RF) energy having a frequency between 1.8 and 40 megacycles.

9. The rearview assembly of claim 7, wherein the front housing includes a peripheral wall disposed between the rearview device and the rear housing.

10. The rearview assembly of claim 7, wherein the rear housing includes an aperture configured through which an ambient light sensor receives ambient light data.

11. The rearview assembly of claim 7, wherein the rearview device includes a front substrate and a rear substrate, and wherein a peripheral edge of the front substrate is exposed, while the rear substrate is concealed between the front substrate and the front housing.

12. The rearview assembly of claim 7, wherein the front housing includes a rearwardly extending inside flange wall that abuts an inside wall of the rear housing.

13. A method of making a rearview assembly comprising:
    operably coupling a rearview device with a front housing;
    applying a bonding material to the front housing;
    operably coupling a printed circuit board with the front housing;
    engaging a rear housing with the front housing; and
    applying energy at an interface of the rear housing and the front housing to bond the front housing with the rear housing.

14. The method of claim 13, wherein the step of applying energy includes applying radio frequency (RF) energy to the interface.

15. The method of claim 14, wherein the step of applying RF energy includes applying RF energy at a frequency between 1.8 and 40 megacycles.

16. The method of claim 13, wherein the step of engaging the rear housing with the front housing includes capturing an engagement protrusion of the rear housing within a channel of the front housing.

17. The method of claim 16, wherein the step of capturing the engagement protrusion includes capturing the engagement protrusion between a peripheral rim and an inside flange of the front housing.

18. The method of claim 13, wherein the step of operably coupling the rearview device with the front housing further comprises defining a peripheral gap between the front housing and an outer edge of the rearview device.

19. The method of claim 18, wherein the step of operably coupling the rearview device with the front housing further comprises positioning a rear substrate of the rearview device within a cavity defined by the front housing.

* * * * *